United States Patent [19]

Piccolo et al.

[11] 4,045,205

[45] Aug. 30, 1977

[54] METHOD FOR THE MANUFACTURE OF SOIL MODIFIERS FROM WASTE MATERIAL OF THE MANUFACTURE OF TITANIUM DIOXIDE

[75] Inventors: Luigi Piccolo, Milan; Gabriele Bottai, Venegono Inferiore (Varese); Antonio Paolinelli, Milan; Angelo La Rovere, Rovereto (Trento), all of Italy

[73] Assignee: Societa Italiana Resine S.I.R. S.p.A., Milan, Italy

[21] Appl. No.: 703,144

[22] Filed: July 7, 1976

[30] Foreign Application Priority Data

July 8, 1975 Italy ................................. 25180/75

[51] Int. Cl.² .............................................. C05D 9/00
[52] U.S. Cl. .......................................... 71/31; 71/40; 71/63; 71/64 SC; 423/548; 423/632
[58] Field of Search ................... 71/1, 25, 31, 40, 51, 71/53, 61, 63, 64 A, 64 R, 64 SC; 423/548, 632

[56] References Cited

U.S. PATENT DOCUMENTS

| | | | |
|---|---|---|---|
| 3,936,292 | 2/1976 | Piccolo et al. | 71/63 |
| 3,974,267 | 8/1976 | Urban, Jr. | 423/633 |

FOREIGN PATENT DOCUMENTS

| | | | |
|---|---|---|---|
| 1,144,248 | 2/1963 | Germany | 423/632 |

*Primary Examiner*—Frank A. Spear, Jr.
*Assistant Examiner*—Ferris H. Lander
*Attorney, Agent, or Firm*—Sughrue, Rothwell, Mion, Zinn and Macpeak

[57] ABSTRACT

Soil modifiers comprising from 80 to 95% by weight of a mixture of ferric oxide and ferric sulphate in an oxide/sulphate weight ratio of from 0.2:1 to 2:1 are prepared by calcining at 500°–600° C in the presence of an oxidizing gas a material consisting essentially of ferrous sulphate with an average number of molecules of crystallization of from 1 to 5 obtained by partial dehydration of the waste materials, consisting essentially of ferrous sulphate heptahydrate, obtained in the manufacture of titanium dioxide from ilmenites or ilmenite slags by the sulphate process. These modifiers are particularly suitable for clay soils.

7 Claims, No Drawings

METHOD FOR THE MANUFACTURE OF SOIL MODIFIERS FROM WASTE MATERIAL OF THE MANUFACTURE OF TITANIUM DIOXIDE

This invention relates to the manufacture of soil modifiers, highly active on compact soils and easy and economical to apply, from waste materials including ferrous sulphate heptahydrate as a main component, obtained in the manufacture of titanium dioxide by the sulphate process.

As is known, many of the world's countries have vast areas of very compact soil, especially clay soils, little suitable for cultivation.

In these soils the structure is such that the composition of particles practically prohibits the circulation of air and water and consequently also the passage of salts from the surface to the root system of the plants.

In such soils water penetrates very slowly, causing expansion of the clay particles which induces closure of the pores or prevents further ingress of water, passage of salts, and circulation of air.

On the other hand, during the dry season water present in these soils, owing to the continuous capillary channels which are always characteristic of hard clay soils, works to the surface carrying with it, also, the salts dissolved in it.

These soils thus come to assume the state of dryness which gives rise to deep cracks and cementing of the clay particles into a hard and very compacted mass.

Under these conditions the life cycle becomes difficult, not only because of insufficient presence of water and insufficient aeration, but also because of the high concentration of salts near the surface.

In methods for modifying the characteristics of compact soils, especially clay soils, so as to render them suitable for cultivation, recourse is frequently made to the application of salts, usually ferric, such as ferric-ammonium alum and ferric sulphate.

These salts induce agglomeration of the minute clay particles into granules, with appreciable improvement in the permeability and aeration of the said soil. Moreover, a porous granular structure diminishes the dangers of scouring and soil erosion.

Agricultural use of ferric sulphate made by conventional methods (sulphation of ferric oxides) is, however, economically onerous.

It has now been found that compact soil modifiers containing ferric oxide and ferric sulphate, having a high and lasting activity and of easy and economical application can be manufactured from the waste materials of the manufacture of titanium dioxide from ilmenites or ilmenite slags by the sulphate method, said waste materials consisting essentially of ferrous sulphate heptahydrate.

Therefore an object of this invention is a method for the preparation of compact soil modifiers, using waste materials of the manufacture of titanium dioxide from ilmenites or ilmenite slags by the sulphate method.

It is known that in the manufacture of titanium dioxide from ilmenites or ilmenite slags by the sulphate method, one of the more serious problems is constituted indeed by the waste materials.

In fact, owing to the scant possibility of using these waste materials, considering also their high impurity content, and since their direct disposal causes considerable pollution, as their reducing properties, their toxicity and the large amounts involved lead to considerable environmental changes, the need is evident to convert them suitably into products devoid of the drawbacks described above.

Obviously the best solution would be to convert the waste products of the manufacture of titanium dioxide into materials which can be advantageously used, this been made possible by the process of this invention.

Thus, the invention provides a process for preparing a compact soil modifier comprising from 80 to 95% by weight of a mixture of ferric oxide and ferric sulphate in an oxide/sulphate weight ratio of from 0.2:1 to 2:1, characterized by calcining at a temperature of from 500° to 600° C, in the presence of an oxidizing gas, a material comprising as a main component hydrated ferrous sulphate with an average number of molecules of crystallization of from 1 to 5 for a period sufficient to convert from 80 to 95% by weight of said hydrated sulphate into ferric oxide and ferric sulphate, said material being obtained by partial dehydration of the waste material consisting essentially of ferrous sulphate heptahydrate, obtained in the manufacture of titanium dioxide from ilmenites or ilmenite slags by the sulphate process.

The said material containing hydrated ferrous sulphate with an average number of molecules of water of crystallisation of from 1 to 5 may be obtained by direct dehydration of said waste material. This dehydration may be effected using the standard equipment suitable for the purpose, such as turbine dryers, fluid bed dryers, quick cycle dryers, usually in a current of hot air.

In another preferred embodiment, said material is obtained by mixing said waste material with a dehydration product of the latter containing hydrated ferrous sulphate with less than 5 molecules of water of crystallisation, in such proportions that the average number of molecules of water of crystallisation per molecule of ferrous sulphate of the resulting mixture is from 1 to 5.

Preferably, the amount of added dehydration product should be from 20 to 50% by weight with respect to the waste material.

In another advantageous form of dehydration the said material is prepared by mixing said waste material and a dehydration product of the latter containing ferrous sulphate with a reduced number of molecules of water of crystallisation, added in an amount of from 20% to 50% by weight in proportion to the weight of said waste material, and subsequently subjecting the resulting mixture to conventional dehydration, e.g. by hot gases.

This embodiment is used especially when one has to bring about a rather boosted dehydration of the waste material, e.g. down to one molecule of water of crystallisation per molecule of ferrous sulphate.

The material consisting essentially of hydrated ferrous sulphate with a reduced average number of molecules of water of crystallisation thus obtained, either by direct dehydration or by mixing with said dehydration product, or by dehydration of the said mixture, is calcined at a temperature of from 500° C to 600° C in an oxidizing atmosphere for a period such as to convert at least 80% up to 95% by weight of said hydrated ferrous sulphate into ferric oxide and ferric sulphate.

Under these temperature conditions, said hydrated ferrous sulphate is converted into a mixture of ferric oxide and ferric sulphate in an oxide/sulphate weight ratio of from 0.2:1 to 2:1.

Generally under the above conditions the calcination period should be from 2 to 5 hours.

The product thus obtained is particularly suitable as compact soil modifier.

When the calcination temperature is taken beyond 600° C a non-negligible decomposition of the ferric sulphate begins to occur, which at temperatures beyond 680° C becomes practically complete. In practice, beyond 680° C one obtains a solid product consisting essentially of ferric oxide and a gaseous effluent comprising oxides of sulphur which can be used to manufacture sulphuric acid.

In other words, calcining the material at a temperature above 600° C one obtains a solid product with a content in ferric sulphate varying in inverse ratio to said temperature whilst the gases evolved consequently contain increasing amounts of oxides of sulphur produced by decomposition and which can be used to manufacture sulphuric acid.

As oxidizing gases, oxygen or air may be used.

The calcination may be carried out according to any one of various conventional methods, the method preferred for the purpose being calcination by means of a rotary calcinator.

It should be pointed out that the soil modifier obtained according to this invention does not consist exclusively of ferric oxide and ferric sulphate in the preparation given, but includes other compounds originally present in small amounts in said waste material, such as compounds of magnesium, silicon, aluminium, titanium and others.

We do not know whether these compounds are directly active as soil modifiers or exert any influence upon said mixtures of ferric oxide and ferric sulphate; but the fact remains that, by comparing under the same conditions the soil-modifying activity of simple mechanical blends of ferric oxide and ferric sulphate in the same proportions as those of the soil modifiers obtained by this invention, with the activity of the latter, these latter are surprisingly more active, as will be clearly shown in the examples.

The soil modifiers obtained by this invention cannot be produced by direct calcination of said waste material. In fact, if one feeds the waste material as such directly to a calcinator, the former causes very resistant incrustations, which in time block the calcinator.

On the contrary, by feeding at the calcination stage the waste material, partially dehydrated or premixed with partially dehydrated waste material, so that the resulting material contains hydrated ferrous sulphate with an average number of water of crystallisation molecules of from 1 to 5, the disadvantages described above are completely avoided.

The said material reacts along the course of the calcinator completely evenly, giving rise to the formation of subdivided and free-flowing powders, easy to handle and weigh, with very slight dragging away of the powders within the gases.

Their granulometry is generally from 0.01 to 3 mm, and preferably from 0.05 to 2 mm.

The products thus obtained can be applied directly in agriculture as soil modifiers, and they are especially advantageous, both because of their high activity and because of the fact that they are conversion products of unwanted wastes.

These products can be used for soil conditioning in amounts which vary especially with the degree of hardness of the soil. Thus in soils that are not excessively compact, from 25 to 50 metric quintals per hectare are sufficient, whilst in very compact clay soils one normally applies from 50 to 150 metric quintals per hectare.

The invention will now be illustrated by the following examples which do not, however, restrict its range.

EXAMPLE 1

There was used a by-product of the manufacture of titanium dioxide from ilmenite by the sulphate method, having the following composition by weight:

| | |
|---|---|
| $FeSO_4 \cdot 7H_2O$ | 88.6% |
| $Al_2(SO_4)_3 \cdot 18H_2O$ | 0.8% |
| $CaSO_4 \cdot 2H_2O$ | 0.26% |
| $H_2SO_4$ free | 0.09% |
| $MgSO_4 \cdot 7H_2O$ | 6.8% |
| $MnSO_4 \cdot 5H_2O$ | 0.56% |
| $TiOSO_4$ | 0.18% |
| $H_2O$ free | 2.7% |
| Other products | traces. |

This by-product was in the form of friable aggregates of small crystals.

Two parts by weight of this by-product and one part by weight of a dehydration product of the latter containing said ferrous sulphate in the monohydrate form and having a granulometry of from 0.015 to 0.6 mm were mixed in a pulverizing mixer.

The mixture was then fed in countercurrent with hot air, at the rate of 85 Kg/h, into a rotary calcinator 500 mm in internal diameter and 10 m in length.

Operation was carried out under the following conditions:

temperature of the hot gases (air) entering the calcinator = 740° C.

temperature of the hot gases issuing from the calcinator = 135° C.

Inlet temperature of the solid mixture = 25° C outlet temperature of the solid-mixture = 550° C period of stay = 4 hours excess of combustion air = 35%

A granular product having a granulometry of from 0.05 to 1 mm was discharged at a rate of 50 Kg/hour.

Analysis of this product gave the following results (percentages are by weight):

| | |
|---|---|
| $Fe_2(SO_4)_3$ | 65.1% |
| $Fe_2O_3$ | 17.8% |
| $FeSO_4$ | 10.0% |
| $MgSO_4$ | 4.5% |
| Others | 2.6% |

No incrustation was observed in the calcinator at the end of the test.

EXAMPLE 2 (COMPARISON)

The test in Example 1 was repeated, but under the following conditions:

inlet temperature of the hot gases = 980° C outlet temperature of the hot gases = 150° C inlet temperature of the solid mixture = 25° C outlet temperature of the solid mixture = 680° C period of stay = 4 hours excess of combustion air = 9%

The gases issuing from the calcinator had the following content in sulphur oxides:

| | |
|---|---|
| $SO_2$ | 0.8 g/m3 |
| $SO_3$ | 0.44 g/m3 |

Analysis of the solid product, discharged at a rate of 25 Kg/hour, gave the following results (wt.%):

| | |
|---|---|
| $Fe_2(SO_4)_3$ | 3.1% |
| $Fe_2O_3$ | 91.6% |
| $FeSO_4$ | 1.3% |
| $MgSO_4$ | 2.0% |
| Others | 2.0% |

EXAMPLE 3 (COMPARISON)

The test in Example 1 was repeated, feeding the by-product as such to the calcinator. After 30 minutes, running had to be stopped, since all the material was adhering to the walls of the calcinator in the form of a very resistant incrustation.

EXAMPLE 4

The test in Example 1 was repeated, but under the following conditions:
inlet temperature of the hot gases = 785° C
outlet temperature of the hot gases = 135° C
inlet temperature of the solid mixture = 25° C
outlet temperature of the solid mixture = 580° C
period of stay = 4 hours
excess of combustion air = 35%

Analysis of the solid product discharged at a rate of 48 Kg/hour gave the following results (wt.%):

| | |
|---|---|
| $Fe_2(SO_4)_3$ | 58.9% |
| $Fe_2O_3$ | 25.5% |
| $FeSO_4$ | 6.9% |
| $MgSO_4$ | 5.0% |
| Others | 2.7% |

EXAMPLE 5

The mixture used in the preceding Examples was first dried to obtain ferrous sulphate with 3 molecules of water of crystallisation.

Dehydration was carried out, first by mixing 2 parts by weight of by-product with one part by weight of said dehydration product and then feeding the mixture to a rapid cycle dryer of the flash dryer type in equicurrent with a flow of hot air. The mixture was fed into the flash dryer at a rate of 240 Kg/h whilst the inlet temperature of the hot gases was equal to 500° C and the outlet temperature equal to 160° C.

The resulting product consisted almost wholly of ferrous sulphate trihydrate, without aggregrates or incrustation in the dryer. This product was then transferred at the rate of 75 Kg/h to a calcinator, of the same type as in the previous examples, operated under the following conditions:
inlet temperature of the hot gases: 850° C
outlet temperature of the hot gases: 180° C
solids inlet temperature: 25° C
solids outlet temperature: 570° C
period of stay: 3 hours
excess of combustion air: 74%

Analysis of the solid discharged at a rate of 45 Kg/h gave the following results (wt.%):

| | |
|---|---|
| $Fe_2(SO_4)_3$ | 51.3% |
| $Fe_2O_3$ | 35.0% |
| $FeSO_4$ | 4.8% |
| $MgSO_4$ | 5.9% |
| Others | 3.0% |

EXAMPLE 6

The activity as soil modifier of the product in Example 1 was investigated.

As laboratory characterisation tests of the conditioning activity, a percolation rate test was carried out and a determination test of the distribution of the clay/silt/-sand fractions on a sample of soil treated with the modifier as compared with a sample of non-treated soil.

In the following, as clay are intended particles of a diameter less than 0.002 mm, as silt, particles of from 0.002 to 0.02 mm, and as sand, particles with a diameter greater than 0.02 mm.

The soil used for testing the product was of the alkaline clay type, originating in Santaluce (Pisa) and its composition was as follows: pH = 8.
Chemical composition:
 $Al_2O_3$ = 11.8%; $SiO_2$ = 39.1%; $Na_2O$ = 0.55%; $K_2O$ = 3.5% $TiO_2$ = 0.8%; $CaO$ = 11.4%; $MgO$ = 3.2%; $Fe_2O_3$ = 6.1%; $CO_2$ = 5.7%; ions $SO_4$ = 0.01%.
Exchangeable cations:
 Na = 0.017%; K = 0.040%; Ca = 0.21%
Mineral composition:
 Illite-Montmorillonite = 32%; Illite = 25%; Chlorite = 35%; Chlorite-Vermiculite = 30%.
Percentages are by weight.

For characterisation tests the product was incorporated in the said soil in an amount of 1%, distributing it homogeneously; the mixture obtained was humidified and then left to mature for 250 hours.

Finally, the whole was de-aggregated and sifted.

The product with less than 2mm granulometry was charged as a layer 100 mm thick into a percolator of diameter equal to 50 mm.

The percolation test was carried out by maintaining a constant head of water, equal to 100 mm, above the surface of the soil.

The comparison test was carried out in the same way on the same type of soil, without the addition of modifier, but prepared similarly to the modified soil.

In this way the modified soil allowed percolation of 345 ml of water in two hours, whereas the non-modified soil allowed percolation of only 85 ml of water.

The test to determine the clay/silt/sand fractions was effected by the S.I.S.S. (International Society of Soil Science) process.

This process effects de-aggregation of the soil by treatment with boiling solutions of ammonium carbonate and then with a solution of sodium hydroxide.

The particle size of the fractions is then determined on the de-aggregated soil using the Andreasen apparatus.

Both the S.I.S.S. process and Andreasen's apparatus are described in Soil Sci. 39, 263 (1935).

In the sample of soil treated the following distribution by weight was recorded:
clay 3%; silt 58%; sand 39%.

In the comparison sample of non-treated soil, on the other hand, the following distribution by weight was recorded: clay 40%; silt 38%; sand 22%.

The same modifier was applied in the field on the same Santaluce type soil in an amount of 7.5 metric tons per hectare, 4 tons of which were applied in Autumn during ploughing which was carried out to a depth of about 35 cm, whilst the remaining 3.5 tons were applied in the following Spring incorporating them into the soil by harrowing to a depth of 10 cm.

On the soil thus treated, and on the compared soil worked in the same way, but not treated with modifier, sorghum seed was sown.

In the soil treated with modifier a yield of 27 metric quintals per hectare of sorghum grain was obtained, whereas in the compared soil a yield of 7 metric quintals per hectare was obtained.

EXAMPLE 7

Activity as soil modifier of the product in Example 2 was investigated, using the same procedure and conditions as in Example 6.

In the percolation test the sample of treated soil allowed percolation of 95 ml of water in 2 hours, as against the 85 ml in the sample of non-modified soil.

In the test to determine the clay/silt/sand distribution in the sample of treated soil the following distribution by weight was recorded: clay 35%; silt 42%; sand 23%.

In field application the yield of sorghum grain was of 11 metric quintals per hectare in the treated soil as against 7 metric quintals per hectare in the untreated soil.

EXAMPLE 8

A soil modifier was prepared by mechanically mixing commercial ferric sulphate and iron dioxide derived from total thermal oxidation of ferrous sulphate at 950° C, in the proportions of the product as in Example 1.

With this mixture there were faithfully reproduced the characterisation tests in the laboratory and in the field as in Example 6.

In the percolation test the sample of treated soil allowed percolation of 280 ml of water in two hours, as against the 85 ml in the sample of untreated soil.

In the test to determine the clay/silt/sand distribution in the sample of treated soil the following distribution by weight was recorded:
clay 11%; silt 55%; sand 34%.

In field application the yield of sorghum grain was of 21 metric quintals per hectare in the soil treated with modifier as against the 7 metric quintals per hectare in the untreated soil.

Comparing Examples 6 and 8 one sees that the effect of the modifier obtained according to this invention is appreciably higher in relation to that of a mechanical mixture of ferric oxide and ferric sulphate.

EXAMPLE 9

The products obtained in Examples 4 and 5 were tested, using the same methods and the same conditions as in Example 6.

Incorporating the product of Example 4 in the test soil, the following results were obtained:
percolation of 332 ml of water in 2 hours;
granulometric distribution by weight: clay 5%, silt 59%, sand 36%,
yield of 26.5 metric quintals of sorghum grain per hectare.

With the product of Example 5, the following results were obtained:
percolation of 320 ml of water in two hours;
granulometric distribution by weight: clay 7%; silt 60%, sand 33%;
yield of 25 metric quintals of sorghum grain per hectare.

We claim:

1. A method for preparing a compact soil modifier comprising from 80 to 95% by weight of a mixture of ferric oxide and ferric sulphate in an oxide/sulphate weight ratio of from 0.2:1 to 2:1, which comprises calcining at a temperature of from 500° to 600° C, in the presence of an oxidizing gas, a material comprising as a main component hydrated ferrous sulphate with an average number of molecules of crystallization of from 1 to 5, for a period sufficient to convert from 80 to 95% by weight of said hydrated sulphate into ferric oxide and ferric sulphate, said material being obtained by the partial dehydration of a waste material consisting essentially of ferrous sulphate heptahydrate obtained in the manufacture of titanium dioxide from ilmenites or ilmenite slags by the sulphate process.

2. The method of claim 1, wherein said material is obtained by the direct dehydration of said waste material.

3. The method of claim 1, wherein said material is obtained by mixing said waste material with a dehydration product of said waste material containing ferrous sulphate with less than five molecules of water of crystallization, in such proportions that the resulting material contains ferrous sulphate with an average number of molecules of water of crystallization of from 1 to 5.

4. The method of claim 3, wherein said dehydration product is added in an amount of from 20 to 50% by weight with respect to said waste material.

5. The method of claim 1, wherein said material is obtained by mixing said waste material with a dehydration product of said waste material containing ferrous sulphate with less than 5 molecules of water of crystallization, said dehydration product being added in an amount of from 20 to 50% by weight with respect to said waste material, and subjecting the resulting mixture to the dehydration.

6. The method of claim 1, wherein oxygen or air is used as oxidizing gas.

7. The method of claim 5, wherein the average number of molecules of water of crystallization per molecule of ferrous sulphate of the mixture of said waste material with said dehydration product of said waste material is from 1 to 5.

* * * * *